(12) United States Patent
Inui et al.

(10) Patent No.: US 9,580,565 B2
(45) Date of Patent: Feb. 28, 2017

(54) SEMI-AROMATIC POLYAMIDE FILM

(71) Applicant: UNITIKA LTD., Hyogo (JP)

(72) Inventors: Yukiko Inui, Kyoto (JP); Naoki Takaishi, Kyoto (JP)

(73) Assignee: UNITIKA LTD., Hyogo (JP)

( * ) Notice: Subject to any disclaimer, the term of this patent is extended or adjusted under 35 U.S.C. 154(b) by 0 days.

(21) Appl. No.: 14/433,398

(22) PCT Filed: Sep. 30, 2013

(86) PCT No.: PCT/JP2013/076473
§ 371 (c)(1),
(2) Date: Apr. 3, 2015

(87) PCT Pub. No.: WO2014/057828
PCT Pub. Date: Apr. 17, 2014

(65) Prior Publication Data
US 2015/0252158 A1    Sep. 10, 2015

(30) Foreign Application Priority Data

Oct. 12, 2012 (JP) .................................. 2012-227104

(51) Int. Cl.
| | | |
|---|---|---|
| *C08L 77/06* | (2006.01) | |
| *C08J 5/18* | (2006.01) | |
| *C08G 69/26* | (2006.01) | |

(52) U.S. Cl.
CPC .............. *C08J 5/18* (2013.01); *C08G 69/265* (2013.01); *C08L 77/06* (2013.01); *C08J 2323/26* (2013.01); *C08J 2377/02* (2013.01); *C08J 2377/06* (2013.01)

(58) Field of Classification Search
None
See application file for complete search history.

(56) References Cited

U.S. PATENT DOCUMENTS

| | | |
|---|---|---|
| 2013/0056107 A1 | 3/2013 | Oyaizu et al. |
| 2013/0295308 A1 | 11/2013 | Kumazawa et al. |
| 2013/0320764 A1 | 12/2013 | Zeller |

FOREIGN PATENT DOCUMENTS

| | | | |
|---|---|---|---|
| JP | 09-012714 | | 1/1997 |
| JP | 2003171550 | * | 6/2003 |
| JP | 2003-321599 | | 11/2003 |
| JP | 2004-217698 | | 8/2004 |
| JP | 2006-281507 | | 10/2006 |
| JP | 2008-179753 | | 8/2008 |
| JP | 2011005856 | * | 1/2011 |
| WO | 2012/076475 A | | 6/2012 |
| WO | 2012/098840 | | 7/2012 |

OTHER PUBLICATIONS

JP 2003171550 Machine translation.*
JP 2011005856 Machind translation.*
International Search Report in PCT/JP2013/076473.
English language machine translation of JP2003-321599.
English language machine translation of JP2006-281507.
English language machine translation of JP09-012714.
English language machine translation of JP2004-217698.
Office Action in corresponding Chinese Patent application No. 201380049231.5.
Extended European Search Report in European Patent Application No. 13846075.3 dated May 23, 2016.
Taiwanese Office Action in Taiwanese Patent Application No. 102136482, dated Sep. 22, 2016.
English language machine translation of JP 2008-179753.

* cited by examiner

*Primary Examiner* — Ana Woodward
(74) *Attorney, Agent, or Firm* — Fildes & Outland, P.C.

(57) ABSTRACT

Disclosed is a semi-aromatic polyamide film including 98 to 90% by mass of a semi-aromatic polyamide (A) and 2 to 10% by mass of a thermoplastic elastomer (B). The semi-aromatic polyamide (A) includes a dicarboxylic acid mainly composed of terephthalic acid and a diamine mainly composed of an aliphatic diamine having 9 carbon atoms. The thermoplastic elastomer (B) has functional groups. The film is a stretched film.

1 Claim, 1 Drawing Sheet

SEMI-AROMATIC POLYAMIDE FILM

TECHNICAL FIELD

The present invention relates to a semi-aromatic polyamide film.

BACKGROUND ART

A semi-aromatic polyamide, which is a polycondensation product of an aliphatic diamine and phthalic acid, is excellent in various performances including heat resistance, as compared with an aliphatic polyamide. Accordingly, developments for the use of semi-aromatic polyamides in applications to films and molded products have recently been promoted. For example, JP09-012714A describes, as a semi-aromatic polyamide, nylon 9T including as constituent components an aliphatic diamine having 9 carbon atoms and terephthalic acid. Nylon 9T has a high melting point falling in the vicinity of 300° C., and hence is high in heat resistance and comparatively low in water absorbability, and accordingly hardly undergoes dimensional change due to water absorption. Accordingly, the use of nylon 9T in various industrial applications has been attracting attention.

Nylon 9T has such properties as described above, and hence it is possible for the film of nylon 9T to establish the compatibility between the heat resistance and the dimensional stability, in contrast to the fact that it has been difficult for conventional thermoplastic films to establish such compatibility. Accordingly, the development of nylon 9T as the material for films has been actively pursued. In particular, it is expected to apply the film obtained from nylon 9T to the fields of so-called industrial films such electric and electronic components and optical films.

Such applications often include applications requiring deformation resistance including flexibility, flex resistance and keying durability, namely, applications to board films and cover lay films for flexible printed circuits (FPCs), and insulating films for switches and touch panels. In particular, in the case where a high-temperature heat treatment step such as reflow treatment is required at the time of processing as in the applications to FPCs, the deformation resistance after performing the heat treatment is demanded.

However, the films formed of nylon 9T are high in the modulus of elasticity at room temperature, and hence sometimes insufficient in the foregoing resistance against deformation. Moreover, the high-temperature heat treatment unfortunately degrades the deformation resistance of the films formed of nylon 9T.

JP2004-217698A discloses a resin composition prepared by adding to a polyamide an elastomer and a cross-linking agent. The resin composition can acquire oil resistance, heat resistance, gas barrier property and flexibility by dispersing the elastomer in the polyamide. The resin composition can acquire thermoplasticity by dispersing in the polyamide the elastomer formed to have a fine spherical shape of approximately 0.1 to 30 μm in diameter, and thus can undergo general-purpose heat melt molding such as extrusion molding, injection molding or press molding. In the first place, the improvement of the impact resistance by finely dispersing an elastomer in the polyamide has been heretofore known as an incompatible polymer alloy technique. On the other hand, it is also heretofore known that different morphologies such as dispersion state of an elastomer result in significantly different properties of molded articles. Accordingly, it is difficult to apply the technique described in JP2004-217698A to the method for producing a thin stretched film wherein the production method is completely different in processing method from heat melt molding, involves deformation at the time of processing and enhances anisotropy in the deformation direction. It is much less possible for the technique described in JP2004-217698A to solve the above-described problem that heretofore known films formed of nylon 9T are insufficient in deformation resistance and are not satisfactory in the deformation resistance after performing heat treatment.

SUMMARY OF INVENTION

Technical Problem

In order to solve the above-described problems, an object of the present invention is to obtain a semi-aromatic polyamide film formed of nylon 9T and sufficiently provided with the deformation resistance including flexibility, flex resistance and keying durability.

Solution to Problem

The present inventors have perfected the present invention by discovering that the above-described object is achieved by mixing a semi-aromatic polyamide and a specific elastomer, and allowing the elastomer to be dispersed in a specific dispersion state in the semi-aromatic polyamide.

Specifically, the gist of the present invention is as follows.

(1) A semi-aromatic polyamide film including: 98 to 90% by mass of a semi-aromatic polyamide (A) including a dicarboxylic acid mainly composed of terephthalic acid and a diamine mainly composed of an aliphatic diamine having 9 carbon atoms; and 2 to 10% by mass of a thermoplastic elastomer (B) having functional groups, wherein the semi-aromatic polyamide film is stretched.

(2) The semi-aromatic polyamide film according to (1), wherein the thermoplastic elastomer (B) having functional groups is an olefin-based thermoplastic elastomer modified with a dicarboxylic acid and/or a derivative of the dicarboxylic acid.

(3) The semi-aromatic polyamide film according to (1) or (2), wherein the thermoplastic elastomer (B) is distributed in the film in a state in which the average minor axis of the domains of the thermoplastic elastomer (B) is 0.01 to 1.0 μm, and the average domain spacing of the thermoplastic elastomer (B) in the cross section in the lengthwise direction of the film is 0.1 to 1.5 μm.

Advantageous Effects of Invention

The semi-aromatic polyamide film of the present invention includes 98 to 90% by mass of the semi-aromatic polyamide (A) including a specific dicarboxylic acid and at the same time, a specific diamine, and 2 to 10% by mass of the thermoplastic elastomer (B) having functional groups and the semi-aromatic polyamide film is stretched. Thus, according to the present invention, it is possible to provide a semi-aromatic polyamide film high in heat resistance, excellent in stretchability and deformation resistance, and small in thickness unevenness. Consequently, the semi-aromatic polyamide film of the present invention can be suitably used as so-called industrial films such as films for applications to electronic and electric components and films for optical applications, in particular, as board films and coverlay films for FPC, or insulating films for switches and touch panels.

DESCRIPTION OF EMBODIMENTS

Figure 1:
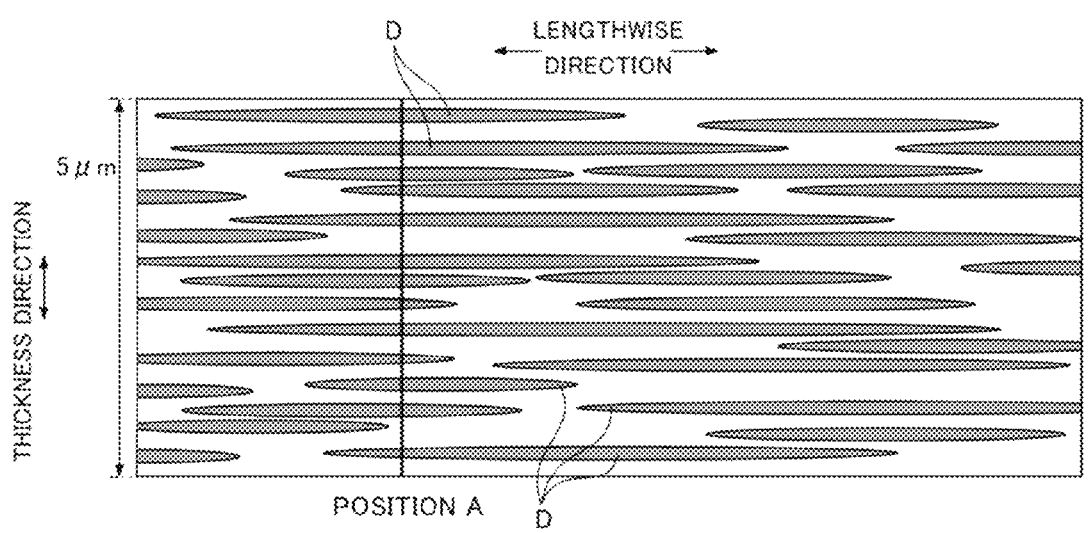
FIG. 1 is a schematic diagram illustrating the distribution state of domains in the cross section in the lengthwise direction of a film.

The semi-aromatic polyamide film of the present invention is a semi-aromatic polyamide film including: 98 to 90% by mass of a semi-aromatic polyamide (A) including a dicarboxylic acid mainly composed of terephthalic acid and a diamine mainly composed of an aliphatic diamine having 9 carbon atoms; and 2 to 10% by mass of a thermoplastic elastomer (B) having functional groups, wherein the semi-aromatic polyamide film is stretched.

First, the semi-aromatic polyamide (A) used in the present invention is described.

The dicarboxylic acid component constituting the semi-aromatic polyamide (A) is required to be mainly composed of terephthalic acid. The proportion of terephthalic acid in the dicarboxylic acid component is preferably 60 to 100 mol %, more preferably 70 to 100 mol % and furthermore preferably 85 to 100 mol %. The proportion being 60 to 100 mol % of terephthalic acid in the dicarboxylic acid component allows the polyamide to be high in heat resistance and low in water absorbability.

Examples of the dicarboxylic acid component, other than terephthalic acid, included in the dicarboxylic acid component constituting the semi-aromatic polyamide (A) include: aliphatic dicarboxylic acids such as oxalic acid, malonic acid, succinic acid, glutaric acid, adipic acid, sebacic acid, dodecanedioic acid, tetradecanedioic acid and octadecanedioic acid; and aromatic dicarboxylic acids such as 1,4-naphthalenedicarboxylic acid, 1,3-naphthalenedicarboxylic acid, 1,2-naphthalenedicarboxylic acid and isophthalic acid.

The diamine component of the semi-aromatic polyamide (A) is required to be mainly composed of an aliphatic diamine having 9 carbon atoms. The proportion of the aliphatic diamine having 9 carbon atoms in the diamine component is preferably 60 to 100 mol %, more preferably 75 to 100 mol % and furthermore preferably 90 to 100 mol %. The proportion being 60 to 100 mol % of the aliphatic diamine having 9 carbon atoms allows the obtained film to be improved in heat resistance and chemical resistance, and to be degraded in water absorbability.

Examples of the aliphatic diamine having 9 carbon atoms include: linear aliphatic diamines such as 1,9-nonanediamine; and branched aliphatic diamines such as 2-methyl-1,8-octanediamine and 4-methyl-1,8-octanediamine. These may be used each alone or in combinations of two or more thereof. Among these, it is preferable to use 1,9-nonanediamine and 2-methyl-1,8-octanediamine in combination from the viewpoint of the moldability.

Examples of the diamine component, other than the aliphatic diamine having 9 carbon atoms, included in the diamine component constituting the semi-aromatic polyamide (A) include: linear aliphatic diamines such as 1,4-butanediamine, 1,5-pentanediamine, 1,6-hexanediamine, 1,7-heptanediamine, 1,8-octanediamine, 1,10-decanediamine, 1,11-undecanediamine and 1,12-dodecanediamine; branched aliphatic diamines such as 4-methyl-1,8-octanediamine and 5-methyl-1,9-nonanediamine; alicyclic diamines such as isophoronediamine and bis(aminomethyl)norbornane; and aromatic diamines such as phenylenediamine.

With the semi-aromatic polyamide (A), lactams such as ∈-caprolactam, ζ-enantholactam, η-capryl lactam and ω-laurolactam may be copolymerized within the range not impairing the object of the present invention.

Among the semi-aromatic polyamides (A) obtained by the foregoing combinations of the monomers, from the viewpoint of heat resistance and moldability of film, a semi-aromatic polyamide (A) is preferable which includes the dicarboxylic acid component composed only of terephthalic acid (terephthalic acid: 100 mol %) and the diamine component including 1,9-nonanediamine and 2-methyl-1,8-octanediamine, in a total content of 60 to 100 mol % in the diamine component.

In the foregoing semi-aromatic polyamide (A), the copolymerization ratio (molar ratio), (1,9-nonanediamine)/(2-methyl-1,8-octanediamine), between 1,9-nonanediamine and 2-methyl-1,8-octanediamine is preferably 50/50 to 100/0, more preferably 70/30 to 100/0 and furthermore preferably 75/25 to 95/5. The copolymerization ratio (molar ratio) between 1,9-nonanediamine and 2-methyl-1,8-octanediamine being 50/50 to 100/0 allows the obtained film to be improved in heat resistance and to be degraded in water absorbability.

The types and the copolymerization proportions of the monomers, constituting the semi-aromatic polyamide (A), are preferably selected in such a way that the Tm (melting point) of the obtained semi-aromatic polyamide (A) falls within a range from 280 to 350° C. By setting of the Tm of the semi-aromatic polyamide (A) so as to fall the foregoing range, the thermal decomposition of the semi-aromatic polyamide (A) when processed into a film can be suppressed. When the Tm is lower than 280° C., the heat resistance of the obtained film becomes insufficient in some cases. On the other hand, when the Tm exceeds 350° C., the thermal decomposition of the semi-aromatic polyamide (A) occurs in some cases at the time of production of a film from the semi-aromatic polyamide (A).

The limiting viscosity of the semi-aromatic polyamide (A) is preferably 0.8 to 2.0 dL/g and more preferably 0.9 to 1.8 dL/g. The limiting viscosity of the semi-aromatic polyamide (A) falling within the range from 0.8 to 2.0 dL/g allows a film excellent in mechanical properties to be obtained. When the limiting viscosity of the semi-aromatic polyamide (A) is less than 0.8 dL/g, it is difficult in some cases to maintain the film shape after formation into a film. On the other hand, when the limiting viscosity of the semi-aromatic polyamide (A) exceeds 2.0 dL/g, in some case it becomes difficult for the film to be brought into close contact with the cooling roll at the time of the film production to degrade the exterior appearance of the film.

As the semi-aromatic polyamide (A), commercially available products can be suitably used. Examples of such a commercially available product include "Genestar (registered trade name)" manufactured by Kuraray Co., Ltd.

The semi-aromatic polyamide (A) can be produced by any process known as a process for the production of a crystalline polyamide. Examples of such a process include: a solution polymerization process or an interfacial polymerization process using as the starting materials an acid chloride and a diamine component; or a process in which a prepolymer is produced by using as the starting materials a dicarboxylic acid component and a diamine component, and the resulting prepolymer is converted into a higher-molecular-weight polymer by melt polymerization or solid phase polymerization.

The prepolymer can be obtained, for example, by heat-polymerizing at a temperature of 200 to 250° C. a nylon salt prepared by simultaneously mixing the diamine component, the dicarboxylic acid component and a polymerization catalyst.

The limiting viscosity of the prepolymer is preferably 0.1 to 0.6 dL/g. The limiting viscosity of the prepolymer made to fall within the foregoing range results in an advantage such that in the successive solid phase polymerization or melt polymerization, the collapse of the molar balance between the carboxyl group in the dicarboxylic acid component and the amino group in the diamine component is prevented, and thus, the polymerization rate can be increased. When the limiting viscosity of the prepolymer is less than 0.1 dL/g, the polymerization time is made longer, and the productivity becomes poor in some cases. On the other hand, when the limiting viscosity of the prepolymer exceeds 0.6 dL/g, the obtained semi-aromatic polyamide is colored in some cases.

The solid phase polymerization of the prepolymer is preferably performed under reduced pressure or in a flow of an inert gas. The temperature of the solid phase polymerization is preferably 200 to 280° C. The temperature of the solid phase polymerization set to fall within the foregoing range, in particular, set to have the upper limit of 280° C. allows the coloration or the gelation of the obtained semi-aromatic polyamide to be suppressed. The temperature of the solid phase polymerization lower than 200° C. makes the polymerization time longer and hence the productivity is poor in some cases.

The melt polymerization of the prepolymer is preferably performed at a temperature of 350° C. or lower. The polymerization performed at a temperature of 350° C. or lower enables efficient polymerization while the decomposition or the thermal degradation is being suppressed. The foregoing melt polymerization includes the melt polymerization using a melt extruder.

In the polymerization of the semi-aromatic polyamide (A), a polymerization catalyst is used. It is preferable to use a phosphorus-based catalyst as the polymerization catalyst from the viewpoint of the reaction rate or the economic efficiency. Examples of the phosphorus-based catalyst include: hypophosphorous acid, phosphorous acid, phosphoric acid, and the salts of these acids (for example, sodium hypophosphite) or the esters of these acids (for example, 2,2-methylenebis(di-t-butylphenyl)octyl phosphite). These may be used each alone or in combinations of two or more thereof.

Above all, a semi-aromatic polyamide (A) obtained by the polymerization using phosphorous acid as the polymerization catalyst is preferable. As compared to the case where the semi-aromatic polyamides polymerized by using other polymerization catalysts (for example, hypophosphorous acid catalyst) are used, the use of phosphorous acid as the polymerization catalyst can suppress the rise of the filtration pressure in the filtration of materials for film formation caused by the use of a filter, in the film formation.

The use of the semi-aromatic polyamide (A) obtained by polymerization using phosphorous acid as the catalyst allows the gelation itself of the obtained resin to be suppressed. Consequently, the occurrence of fish-eyes is suppressed.

The content of the polymerization catalyst in the obtained semi-aromatic polyamide (A) is preferably 0.01 to 5% by mass, more preferably 0.05 to 2% by mass and furthermore preferably 0.07 to 1% by mass in relation to the total amount of the dicarboxylic acid component and the diamine component. The content of the polymerization catalyst falling within a range from 0.01 to 5% by mass allows the semi-aromatic polyamide to be efficiently polymerized while the degradation of the semi-aromatic polyamide is being suppressed. The content of the polymerization catalyst of less than 0.01% by mass does not develop the catalysis in some cases. On the other hand, the content of the polymerization catalyst exceeding 5% by mass causes disadvantage in terms of economic efficiency in some cases.

Furthermore, if necessary, a terminal blocking agent may be used together with the diamine component, the dicarboxylic acid component and the polymerization catalyst. Such a terminal blocking agent is not particularly limited as long as the terminal blocking agent is a monofunctional compound having reactivity with the amino group or the carboxyl group at the terminal of the semi-aromatic polyamide (A). Examples of such a terminal blocking agent include monocarboxylic acids, monoamines, acid anhydrides, monoisocyanates, monoacid halides, monoesters and monoalcohols.

Above all, monocarboxylic acids or monoamines are preferable from the viewpoint of the reactivity, the stability of the blocked terminal group and the like, and from the viewpoint of the easiness in handling, monocarboxylic acids are more preferable. Examples of the monocarboxylic acids include: acetic acid, propionic acid, butyric acid, valeric acid, caproic acid, caprylic acid, lauric acid, tridecylic acid, myristic acid, palmitic acid, stearic acid and benzoic acid.

The amount used of the terminal blocking agent can be appropriately selected according to the reactivity and the stability of the terminal blocking agent used, the reactor and the reaction conditions. The detail amount used of the terminal blocking agent is preferably 0.1 to 15 mol % in relation to the total number of moles of the dicarboxylic acid component and the diamine component from the viewpoint of the regulation of the molecular weight and the suppression of the decomposition of the resin.

In the semi-aromatic polyamide (A) used in the present invention, the terminal groups of the molecular chain are preferably blocked with such a terminal blocking agent as described above. The proportion of the blocked terminal groups in relation to the total amount of the terminal groups is preferably 10 mol % or more, more preferably 40 mol % or more and furthermore preferably 70 mol % or more. The proportion of the blocked terminal groups being 10 mol % or more enables to suppress the decomposition of the resin or the increase of the molecular weight with the progress of the condensation during melt molding. Accordingly, the occurrence of bubbles due to the decomposition of the resin is also suppressed, and hence the exterior appearance of the film obtained from the semi-aromatic polyamide (A) can be made excellent.

Next, the thermoplastic elastomer (B) having functional groups, used in the present invention is described.

The thermoplastic elastomer (B) used in the present invention has a constitution including hard segments and soft segments.

The hard segments may be a crystalline resin or an amorphous resin. When the hard segments are a crystalline resin, the melting point of the crystalline resin is preferably 150° C. or lower and more preferably 130° C. or lower. On the other hand, when the hard segment is an amorphous resin, the glass transition temperature of the amorphous resin is preferably 120° C. or lower. The melting point being 150° C. or lower or the glass transition temperature being 120° C. or lower of the resin used for the hard segment improves the stretching followability in the biaxial stretching of the polymer including the semi-aromatic polyamide (A) and the thermoplastic elastomer (B) to allow the stretching to be performed efficiently. When the melting point of the resin used for the hard segments exceeds 150° C. or the glass transition temperature of the resin concerned exceeds 120° C., no uniform stretching can be performed, and hence no predetermined dispersion state of the thermoplastic elastomer (B) is obtained in some cases, or the planarity of the stretched film is degraded in some cases. In this connection, voids are generated in the stretched film or moreover, the film undergoes stretching breakage in some cases.

The soft segments are formed of a rubber resin. The glass transition temperature of the rubber resin is preferably −30° C. or lower and more preferably −40° C. or lower. The glass transition temperature of the resin used for the soft segments falling in the range of −30° C. or lower improves the flex resistance and the keying durability of the obtained stretched film.

Examples of the type of the thermoplastic elastomer (B) include: a polyolefin-based thermoplastic elastomer, a polyester-based thermoplastic elastomer, a polyamide-based thermoplastic elastomer and a styrene-based thermoplastic elastomer. These thermoplastic elastomers (B) may be used each alone or in combinations of two or more thereof.

Examples of the polyolefin-based thermoplastic elastomer include a polyolefin-based thermoplastic elastomer including as the hard segments a thermoplastic highly-crystalline polyolefin and as the soft segments an ethylene-α-olefin-based copolymer rubber. Specifically, examples of the resin for the hard segments include homopolymers of α-olefins having 1 to 4 carbon atoms or copolymers of two or more of these α-olefins. Among these, polyethylene or polypropylene is preferable. Examples of the resin for the soft segments include butyl rubber, halobutyl rubber, EPDM (ethylene-propylene-diene rubber), EPR (ethylene-propylene rubber), acrylonitrile-butadiene rubber, NBR (nitrile rubber), EBR (ethylene-1-butene rubber) and natural rubber.

Examples of the polyester-based thermoplastic elastomer include a multiblock polymer in which the hard segments use an aromatic polyester having a high melting point and high crystallinity such as polybutylene terephthalate (PBT) and the soft segments use an amorphous polyether such as polytetramethylene ether glycol (PTMG).

Examples of the polyamide-based thermoplastic elastomer include a block polymer in which the hard segments are a polyamide such as nylon and the soft segments are a polyester or a polyol.

Examples of the styrene-based thermoplastic elastomer include a polymer in which the hard segments are polystyrene and the soft segments are a copolymer of conjugated diene compounds and the hydrogenated product of the copolymer. Examples of the resin for the soft segments include isoprene rubber, butadiene rubber, hexadiene rubber and 2,3-dimethyl-1,3-butadiene rubber.

The thermoplastic elastomer (B) used in the present invention is required to have the functional groups capable of reacting with the amino groups and the carboxyl groups, which are the terminal groups of the semi-aromatic polyamide (A), and the amide groups of the main chain of the semi-aromatic polyamide (A). The functional groups are preferably at least a functional group selected from a carboxyl group or the anhydride of the carboxyl group, an amino group, an epoxy group, an amide group and an isocyanate group, and are more preferably a dicarboxylic acid and/or the derivatives thereof. When a thermoplastic elastomer having no functional groups capable of reacting with the terminal groups of the semi-aromatic polyamide (A) is used, the stretchability at the time of biaxial stretching is degraded and no uniform stretched film is obtained in some cases. Additionally, the deformation resistance of the resulting stretched film is insufficient in some cases.

In the present invention, among the thermoplastic elastomers modified with a dicarboxylic acid and/or the derivatives thereof, the thermoplastic elastomer is preferably a polyolefin-based thermoplastic resin. Examples of such a resin includes Tafmer manufactured by Mitsui Chemicals, Inc.

In the biaxially stretched semi-aromatic polyamide film of the present invention, the mixing ratio (A/B) between the semi-aromatic polyamide (A) and the thermoplastic elastomer (B) is required to be 98/2 to 90/10 (mass ratio) and is preferably 96/4 to 92/8 (mass ratio). When the mixing proportion of the thermoplastic elastomer (B) is less than 2% by mass, the effect of the addition of the thermoplastic elastomer (B) is small and the deformation resistance of the stretched film is insufficient in some cases. On the other hand, the mixing proportion of the thermoplastic elastomer (B) exceeds 10% by mass, excessive quality is attained, film formability is poor because of the excessively high melt viscosity during extrusion film formation, and the stretchability during biaxial stretching is degraded and no uniform stretched film is obtained in some cases.

Examples of the kneader used for kneading of the semi-aromatic polyamide (A) and the thermoplastic elastomer (B) include, without being particularly limited to: usually heretofore known melt kneaders such as a single screw extruder, a twin screw extruder, a Banbury mixer, a kneader and a mixing roll. Among these, the twin screw extruder is preferable from the viewpoint of the improvement of the dispersibility of the thermoplastic elastomer (B). The melt kneading temperature is usually equal to or higher than the melting point of the semi-aromatic polyamide (A). The thermoplastic elastomer (B) may be kneaded with the semi-aromatic polyamide (A) at the time of film preparation, or alternatively, a master batch including as mixed therein the thermoplastic elastomer (B) in a high concentration is prepared, and then the masterbatch may be kneaded with the semi-aromatic polyamide (A).

A heat stabilizer is preferably included in the semi-aromatic polyamide film of the present invention, for the purpose of enhancing the thermal stability during the film formation, preventing the degradation of the strength and the elongation rate of the film, and preventing the degradation of the film during use due to the oxidation, decomposition or the like. Examples of the heat stabilizer include a hindered phenol heat stabilizer, a hindered amine stabilizer, a phosphorus-based heat stabilizer, a sulfur-based heat stabilizer and a bifunctional type heat stabilizer.

Examples of the hindered phenol heat stabilizer include: Irganox 1010 (registered trademark) (pentaerythritol tetrakis [3-(3,5-di-tert-butyl-4-hydroxyphenyl) propionate], manufactured by BASF Japan Ltd.), Irganox 1076 (registered trademark) (octadecyl-3-(3,5-di-tert-butyl-4-hydroxy phenyl) propionate, manufactured by BASF Japan Ltd.), Cyanox 1790 (registered trademark) (1,3,5-tris(4-t-butyl-3-hydroxy-2,6-dimethylbenzyl)isocyanuric acid, manufactured by Cyanamide Co.), Irganox 1098 (registered trademark) (N,N'-(hexane-1,6-diyl)bis[3-(3,5-di-tert-butyl-4-hydroxyphenyl)propione amide], manufactured by BASF Japan Ltd.), Sumilizer GA-80 (registered trademark) (3,9-bis[2-{3-(3-t-butyl-4-hydroxy-5-methylphenyl)propionyloxy}-1,1-dimethylethyl]-2,4,8,10-tetraoxaspiro[5.5]undecane, manufactured by Sumitomo Chemical Co., Ltd.).

Examples of the hindered amine heat stabilizer include Nylostab S-EED (registered trademark, 2-ethyl-2'-ethoyoxal anilide, manufactured by Clariant (Japan) K.K.).

Examples of the phosphorus-based heat stabilizer include: Irgafos 168 (registered trademark) (tris(2,4-di-tert-butylphenyl) phosphite, manufactured by BASF Japan Ltd.), Irgafos 12 (registered trademark) (6,6',6''-[nitrilotris(ethyleneoxy)]tris(2,4,8,10-tetra-tert-butyldibenzo[d,f][1,3,2]dioxaphosphepine), manufactured by BASF Japan Ltd.), Irgafos 38 (registered trademark) (bis(2,4-bis(1,1-dimethylethyl)-6-methylphenyl)ethyl ester phosphorous acid, manufactured by BASF Japan Ltd.), ADKSTAB 329K (registered trademark) (tris(mono-dinonylphenyl) phoshpite, manufactured by Asahi Denka Kogyo Co., Ltd.), ADKSTAB PEP36 (registered trademark) (bis(2,6-di-tert-butyl-4-methylphenyl) pentaerythritol diphosphite, manufactured by Asahi Denka Kogyo Co., Ltd.), Hostanox P-EPQ (registered trademark) (tetrakis(2,4-di-tert-butylphenyl)-4,4'-biphenylene diphosphonite, manufactured by Clariant K.K.), GSY-P101 (registered trademark) (tetrakis(2,4-di-tert-butyl-5-methylphenyl)-4,4'-biphenylene diphosphonite, manufactured by Sakai Chemical Industry Co., Ltd.) and Sumilizer GP (registered trademark) (6-[3-(3-tert-butyl-4-hydroxy-5-methylphenyl)propoxy]-2,4,8,10-tetra-tert-butyldibenz[d,f][1,3,2]-dioxaphosphepin, manufactured by Sumitomo Chemical Co., Ltd.).

Examples of the sulfur-based heat stabilizer include: DSTP (registered trademark) (chemical formula name: distearyl thiodipropionate, manufactured by Yoshitomi Pharmaceutical Industries, Ltd.), Seenox 412S (registered trademark) (pentaerythritol tetrakis-(3-dodecylthiopropionate), manufactured by Shipro Kasei Kaisha, Ltd.) and Cyanox 1212 (registered trademark) (lauryl stearyl thiodipropionate, manufactured by Cyanamide Co.).

Examples of the bifunctional type heat stabilizer include: Sumilizer GM (registered trademark) (2-tert-butyl-6-(3-tert-butyl-2-hydroxy-5-methylbenzyl)-4-methylphenyl acrylate, manufactured by Sumitomo Chemical Co., Ltd.) and Sumilizer GS (registered trademark) (2-[1-(2-hydroxy-3,5-di-tert-pentylphenyl)ethyl]-4,6-di-tert-pentylphenyl acrylate, manufactured by Sumitomo Chemical Co., Ltd.).

From the viewpoint of preventing the degradation of the film strength, hindered phenol heat stabilizers are preferable. The thermal decomposition temperature of the hindered phenol heat stabilizer is preferably 320° C. or higher and more preferably 350° C. or higher. Examples of the hindered phenol heat stabilizers having a thermal decomposition temperature of 320° C. or higher include Sumilizer GA-80. When a hindered phenol heat stabilizer has an amide bond, the hindered phenol heat stabilizer can prevent the degradation of the film strength. Examples of the hindered phenol heat stabilizer having an amide bond include Irganox 1098. When the hindered phenol heat stabilizer is used in combination with a bifunctional type heat stabilizer, the degradation of the film strength can be further reduced.

These heat stabilizers may be used each alone or in combinations of two or more thereof. For example, a combinational use of a hindered phenol heat stabilizer and a phosphorus-based heat stabilizer can prevent the pressure rise of the filter for filtering materials at the time of film formation, and can also prevent the degradation of the film strength. Alternatively, a combinational use of a hindered phenol heat stabilizer, a phosphorus-based heat stabilizer and a bifunctional type heat stabilizer can prevent the pressure rise of the filter for filtering materials at the time of film formation, and can also further reduce the degradation of the film strength.

As the combination of the hindered phenol heat stabilizer and the phosphorus-based heat stabilizer, a combination of Hostanox P-EPQ or GSY-P101 with Sumilizer GA-80 or Irganox 1098 is preferable. As the combination of the hindered phenol heat stabilizer, the phosphorus-based heat stabilizer and the bifunctional type heat stabilizer, a combination of Hostanox P-EPQ or GSY-P101, Sumilizer GA-80 or Irganox 1098, and Sumilizer GS is preferable, and a combination of GSY-P101, Sumilizer GA-80 and Sumilizer GS is more preferable.

The content of the heat stabilizer in the semi-aromatic polyamide film of the present invention is preferably 0.01 to 2 parts by mass and more preferably 0.05 to 1 part by mass in relation to 100 parts by mass of the semi-aromatic polyamide (A). The content of the heat stabilizer falling within a range from 0.01 to 2 parts by mass allows the thermal decomposition to be more efficiently suppressed. When two or more heat stabilizers are used in combination, the content of each of the heat stabilizers and the total content of the heat stabilizers each preferably fall within the foregoing range.

In the semi-aromatic polyamide film of the present invention, lubricant particles are preferably included for the purpose of achieving satisfactory slippage. Examples of the lubricant particles include: inorganic particles such as silica, alumina, titanium dioxide, calcium carbonate, kaolin and barium sulfate; and organic fine particles such as acrylic resin particles, melamine resin particles, silicone resin particles and cross-linked polystyrene particles.

Various additives may be included, if necessary, in the semi-aromatic polyamide film of the present invention, within a range not impairing the advantageous effects of the present invention. Examples of the additives include: colorants such as pigments and dyes, coloration inhibitors, antioxidants other than the foregoing heat stabilizers, weatherability improvers, flame retardants, plasticizers, mold release agents, reinforcing agents, modifiers, antistatic agents, ultraviolet absorbers, anticlouding agents and various polymers.

Examples of the pigment include titanium oxide. Examples of the weatherability improver include benzotriazole compounds. Examples of the flame retardant include bromine-based flame retardants and phosphorus-based flame retardants. Examples of the reinforcing agent include talc.

For the purpose of including such additives as described above in the semi-aromatic polyamide film of the present invention, such additives may be added at any stages in the production of the semi-aromatic polyamide film.

The semi-aromatic polyamide film of the present invention is required to be stretched, namely, stretched uniaxially or biaxially, and is preferably biaxially stretched. By stretching, the polyamide resin preferably undergoes oriented crystallization. The stretching conditions and the stretching magnification factors are not particularly limited; however, in the case of biaxial stretching, the stretching magnification factor is preferably 2 or more and more preferably 2.5 or more both in the lengthwise direction (hereinafter, abbreviated as "MD" in some cases) and in the widthwise direction (hereinafter, abbreviated as "TD" in some cases). The stretching magnification factor set at 2 or more allows the below-described state of the domains of the thermoplastic elastomer (B) to fall within a preferable range, so as to accordingly improve the deformation resistance of the film. When the stretching magnification factor is 2 or less, the degree of the oriented crystallization due to the stretching is low and accordingly the strength and the heat resistance of the film stretched is poor in some cases.

The thickness unevenness of the stretched semi-aromatic polyamide film of the present invention is preferably 10% or less, more preferably 8% or less and furthermore preferably 6% or less. The thickness unevenness falling within a range of 10% or less allows the slacks and wrinkles in the film at the time of processing thereof to be reduced. For the purpose of making the thickness unevenness fall within the range of 10% or less, the techniques such as the regulation of the shape of the unstretched film or the regulation of the stretching conditions are quoted. The definition and the measurement method of the thickness unevenness are described in detail in the section of Examples.

The smaller the thermal shrinkage rate of the stretched semi-aromatic polyamide film of the present invention, the more preferable. For example, the thermal shrinkage rate due to the heating with hot air at 200° C. for 15 minutes is preferably 3.0% or less, more preferably 1.0% or less and furthermore preferably 0.5% or less. For the purpose of making the thermal shrinkage rate fall within the range of 3.0% or less, the techniques such as the regulation of the conditions of the heat treatment or the relaxation treatment (a treatment of continuous reduction of the film width in order to regulate the thermal shrinkage property of the film) are adopted.

The tensile strength of the stretched semi-aromatic polyamide film of the present invention is preferably 130 MPa or more both in MD and TD, and the tensile elongation rate of the stretched semi-aromatic polyamide film of the present invention is preferably 50% or more both in TD and in MD. For the purpose of making each of the tensile strength and the tensile elongation rate fall within the foregoing range, the techniques such as the regulation of the stretching magnification factor are adopted.

In the present invention, the domains of the thermoplastic elastomer (B) in the stretched semi-aromatic polyamide film are usually plate-shaped and are substantially parallel to the surface of the film. The dispersion state of the domains in the film can be evaluated by the below-described TEM photograph observation. Specifically, the average minor axis, the average anisotropy index, the average domain spacing and the like of the domains of the thermoplastic elastomer (B) in the film can be evaluated. The average minor axis of the domains of the thermoplastic elastomer (B) falling in a range from 0.01 to 1.0 μm, and the average domain spacing of the thermoplastic elastomer (B) falling in a range from 0.1 to 1.5 μm allow the resistance to the deformation due to force exerted in the surface direction of the film to be improved. When the average minor axis of the domains and the average domain spacing fall outside the foregoing preferable ranges, the improvement effect of the deformation resistance is insufficient in some cases, and the film quality degradation such as the thickness unevenness of the stretched film occurs in some cases. The average anisotropy index falling in a range from 10 to 50 allows the resistance to the deformation due to force exerted in the surface direction of the film to be further improved.

The average minor axis of the domains of the thermoplastic elastomer (B) is more preferably 0.03 to 1.0 μm. The average domain spacing of the thermoplastic elastomer (B) is more preferably 0.1 to 1.0 μm. The average anisotropy index of the domains of the thermoplastic elastomer (B) is more preferably 20 to 50. When the average minor axis of the domains, the average anisotropy index of the domains and the average domain spacing fall outside the foregoing preferable ranges, the improvement effect of the deformation resistance is insufficient in some cases, and the film quality degradation such as the thickness unevenness of the stretched film occurs in some cases.

For the purpose of controlling the dispersion state, mainly (1) the selection of the semi-aromatic polyamide (A), (2) the selection of the thermoplastic elastomer (B), (3) the regulation of the kneading conditions and (4) the regulation of the stretching conditions are required to be achieved. These (1) to (3) determine the dispersion state in the unstretched film, and additionally (4) determines the dispersion state after the stretching.

For the dispersion state in the unstretched film, the average particle size of the thermoplastic elastomer (B) in the unstretched film is preferably 0.01 to 10 μm and more preferably 0.05 to 5 μm. For the purpose of controlling the average particle size of the thermoplastic elastomer (B) in the unstretched film so as to fall in a range from 0.01 to 10 μm, for example, the melt viscosity of the aromatic polyamide (A) and the melt viscosity of the thermoplastic elastomer (B) may be made close to each other; alternatively, when the semi-aromatic polyamide (A) and the thermoplastic elastomer (B) are kneaded with each other, the mixing proportion of the thermoplastic elastomer (B) may be reduced, or a strong kneading may be performed on the basis of the structure of the screw for kneading and the temperature conditions for kneading.

The dispersion state of the domains after stretching can be regulated by controlling the stretching conditions, in particular, the conditions such as the stretching temperature, the stretching magnification factor and the relaxation treatment. For example, by stretching the unstretched film in a high orientation and with a high magnification factor when the unstretched film is stretched, the anisotropy of the thermoplastic elastomer (B) can be enhanced, and thus the domain spacing can be small.

To the stretched semi-aromatic polyamide film of the present invention, if necessary, the treatment for improving the adhesiveness of the surface of the film concerned can be applied. Examples of such a method for improving the adhesiveness include corona treatment, plasma treatment, acid treatment and flame treatment.

To the surface of the stretched semi-aromatic polyamide film of the present invention, various coating agents may be applied for the purpose of imparting to the surface the functions such as easy adhesiveness, antistatic property, mold release property and gas barrier property.

On the stretched semi-aromatic polyamide film of the present invention, inorganic substances such as metals and oxides thereof, various polymers, paper, woven fabric, non-woven fabric, wood and the like may be laminated.

Next, the method for producing the stretched semi-aromatic polyamide film of the present invention is described by taking as an example the case where biaxial stretching is performed.

As an example of the method for producing the biaxially stretched semi-aromatic polyamide film of the present invention, the following method can be quoted: the semi-aromatic polyamide (A) and the thermoplastic elastomer (B) are mixed in appropriate proportions; the resulting mixture is melt-mixed in an extruder at a temperature of 280 to 340° C. for 3 to 15 minutes, and then extruded through a T-die in a sheet; the extruded product is brought into close contact with a drum regulated in temperature to be 30 to 80° C. and cooled to produce an unstretched film; subsequently, the resulting unstretched film is introduced into a simultaneous biaxial stretching machine, simultaneously biaxially stretched at a temperature of 120 to 150° C. so as for the stretching magnification factors both in TD and in MD to be approximately 2 to 4, and further subjected to a heat treatment at 150 to 300° C. for a few seconds with a relaxation in TD set at a few percents. Before the introduction into the biaxially stretching machine, the film may also be subjected to a preliminary longitudinal stretching with a magnification factor of 1 to 1.2.

The biaxially stretched semi-aromatic polyamide film of the present invention can also be produced by a successive stretching method. As an example of such a method, the following method is quoted: an unstretched film is obtained by performing the same operations as described above, the resulting film is subjected to a heat treatment such as roll heating or infrared ray heating, and then longitudinally stretched to yield a longitudinally stretched film; the longitudinal stretching preferably stretches the unstretched film with a stretching magnification factor of 2.0 to 3.6 by taking advantage of the circumferential speed difference between two or more rolls, in a temperature range from Tg to (Tg+40° C.), wherein Tg represents the glass transition point of the semi-aromatic polyamide. Successively, the longitudinally stretched film is continuously, sequentially subjected to transverse stretching, heat setting and relaxation treatment, to yield a biaxially stretched film; the biaxial stretching is started from the same temperature range of Tg to (Tg+40° C.) as that for the longitudinal stretching, and the maximum temperature is preferably a temperature lower by 100 to 150° C. than the melting point (Tm) of the semi-aromatic polyamide; the magnification factor of the transverse stretching is regulated according to the properties required for the final film, and is preferably 2.5 or more and more preferably 3.0 or more; at the time of the heat setting treatment following the transverse stretching, the film may also be additionally stretched by 2 to 20% in the transverse direction, namely, the widthwise direction of the film. However, such a stretching rate is to be included in the total stretching magnification factor; after the heat setting treatment, the relaxation treatment is performed, and then the film is cooled to Tg or lower to yield a biaxially stretched film.

Preferably, in the production apparatus of the film, the surface of each of the melting section of the cylinder or the barrel, the metering section, the single pipe, the filter, the T-die and others is subjected to a treatment to reduce the surface roughness for the purpose of preventing the retention of the resin. Examples of the method for reducing the roughness of the surface include a method of modifying the surface with a low polarity substance, or a method in which silicon nitride or diamond-like carbon is vapor deposited on the surface.

Examples of the method for stretching the film include a flat successive biaxial stretching method, a flat simultaneous biaxial stretching method and a tubular method. Above all, it is preferable to adopt the flat simultaneous biaxial stretching method, from the viewpoint of being capable of improving the film thickness precision and making uniform the physical properties in MD of the film.

Examples of the stretching apparatus for adopting the flat simultaneous biaxial stretching method include a screw-type tenter, a pantagraph-type tenter and a linear-motor-driven clip-type tenter can be used.

The heat treatment after stretching is a step required for imparting the dimensional stability of the film. Examples of the heat treatment method include heretofore known methods such as a hot-air blowing method, an infrared radiation irradiation method and a microwave irradiation method. Among these, the hot-air blowing method is preferable because of being capable of heating the film uniformly with a satisfactory accuracy.

The obtained semi-aromatic polyamide film may be processed into a form of sheet, or may be wound up by a wind-up roll into a form of a roll. From the viewpoint of the productivity when used in various applications, the film is preferably made to have a form of a film roll. When the film is in a form of a film roll, the film may be slit into intended widths.

The semi-aromatic polyamide film of the present invention obtained as described above is excellent in mechanical properties, heat resistance, humidity-heat resistance, chemical resistance and low water absorbability, intrinsically possessed by nylon 9T, and additionally excellent in deformation resistances such as flexibility, flex resistance and keying durability. Accordingly, the stretched semi-aromatic polyamide film of the present invention can be suitably used as films for household use and films for industrial materials such as: packaging materials for medical supplies; food packaging materials of retort food; packaging materials for electronic components such as semiconductor packages; electric insulating materials for motors, transformers and cables; dielectric materials for use in capacitors and the like; materials for magnetic tapes such as cassette tapes, magnetic tapes for data storage for digital data storage, and video tapes; protective plates for solar cell boards, liquid crystal plates, conductive films, display devices and the like; electronic board materials for LED mounting boards, flexible printed wiring boards, flexible flat cables and the like; heat-resistant adhesive tapes such as cover lay films for flexible printed wiring boards, heat-resistant masking tapes and industrial process tapes; heat-resistant bar code labels; heat-resistant reflectors; various mold release films; heat-resistant adhesive base films; photographic films; molding materials; agricultural materials; medical materials; civil engineering and building materials; and filtration membranes.

EXAMPLES

1. Analyses

The measurements of the physical properties of the semi-aromatic polyamide, the thermoplastic elastomer and the semi-aromatic polyamide film were performed by the following methods.

(1) Limiting Viscosity of Semi-Aromatic Polyamide

In concentrated sulfuric acid having a concentration of 96% by mass, the semi-aromatic polyamide resin was dissolved at 30° C. so as for the concentration to be 0.05 g/dL, 0.1 g/dL, 0.2 g/dL and 0.4 g/dL, and thus the reduced viscosity of the semi-aromatic polyamide resin was determined for each of these concentrations. Then, by using these reduced viscosities, the value obtained by extrapolating to the concentration of 0 g/dL was taken as the limiting viscosity.

(2) Melting Point (Tm) and Glass Transition Temperature (Tg) of Semi-Aromatic Polyamide or Thermoplastic Elastomer By using a differential scanning calorimeter (DSC-7, manufactured by Perkin-Elmer Corp.), 10 mg of the semi-aromatic polyamide or the thermoplastic elastomer was increased in temperature (1st Scan) in a nitrogen environment from 20° C. to 350° C. at a rate of 10° C./min, and was maintained at 350° C. for 5 minutes. Then, the semi-aromatic polyamide or the thermoplastic elastomer was decreased in temperature down to 20° C. at a rate of 100° C./min, maintained at 20° C. for 5 minutes, and then further increased in temperature to 350° C. at a rate of 20° C./min (2nd Scan). The peak top temperature of the crystal fusion peak observed in the 2nd Scan was taken as the melting point, and the temperature corresponding to the midpoint between the two bending points due to the glass transition was taken as the glass transition temperature.

(3) Thermal Decomposition Temperature of Heat Stabilizer

By using a thermogravimetry/differential thermal analyzer (TG/DTA 7000, manufactured by SII Nanotechnology Inc.), a sample was increased in temperature in a nitrogen atmosphere of 200 mL/min, from 30° C. to 500° C. at a rate of 20° C./min. The temperature at which the mass was reduced by 5% by mass in relation to the mass before the temperature increase was taken as the thermal decomposition temperature.

(4) Stretchability

The unstretched film of each of Examples was stretched by a predetermined method and a predetermined magnification factor, and the resulting state of the film was evaluated according to the following standards.

Good: Stretching can be performed without problems.
Poor: No stretched film is obtained because of breakage.

(5) Average Thicknesses of Unstretched Film and Stretched Film

By using a thickness gauge (MT 12B, manufactured by Heidenhain Corp.), in an environment of a temperature of 20° C. and a humidity of 65%, the thickness of each of the films was measured 10 times at the positions central in TD every 1 m in MD. The average thickness was obtained from the measurement values at the 10 positions.

(6) Thickness Unevenness of Stretched Film

In each of the stretched films, the thicknesses of the randomly selected 30 points in the 20 cm×20 cm area in the portion central in the widthwise direction were measured in an environment of a temperature of 20° C. and a humidity of 65%. The maximum and minimum values of the measurement values were represented by Lmax and Lmin, respectively, and the average value of the measurement values was represented by La. The value represented by the following formula was defined as the thickness unevenness R, and was evaluated according to the following standards.

$$R=[(Lmax-Lmin)/La]\times 100(\%)$$

Excellent: R≤10
Good: 10<R≤15
Average: 15<R≤20
Poor: 20<R (7) Dispersion State of Thermoplastic Elastomer in Stretched Film The six positions in the lengthwise cross-section and the widthwise cross-section (three positions in each of lengthwise cross-section and the widthwise cross-section) in the portion randomly sampled from the central portion in the widthwise direction of each of the stretched films were subjected to TEM observation with the transmission electron microscope JEM-1230 manufactured by JEOL Ltd. (acceleration voltage: 100 kV, direct magnification: 20000). As the samples, 100-nm-thick slices cut out with a freezing ultramicrotome were used.

(7-1) Average Major Axis and Average Minor Axis

Figure 2:
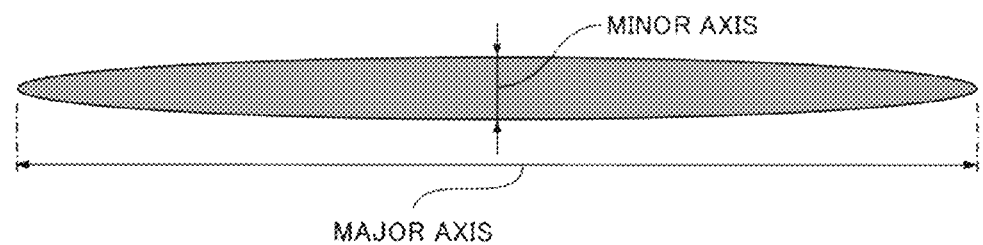
FIG. 2 is a schematic diagram illustrating the major axis and the minor axis in a domain in the film.

By using the obtained TEM photographs, the maximum diameter of the domains in the lengthwise direction or the widthwise direction of each of the films, and the maximum diameter of the domains in the thickness direction of each of the films were measured, and were taken as the "major axis" and the "minor axis," respectively. FIG. 2 schematically illustrates these axes. Specifically, for one sheet of TEM photograph, the major axes and the minor axes of 20 of the domains De were measured; six sheets of TEM photographs were used and the major axes and the minor axes of 120 domains in total were measured, and the average value of these major axes and the average value of these minor axes were taken the "average major axis" and the "average minor axis," respectively.

(7-2) Average Anisotropy Index

For each of the films, the value of the average major axis/average minor axis was taken as the "average anisotropy index,"

(7-3) Average Domain Spacing of Thermoplastic Elastomer in Stretched Film

Five positions in the lengthwise cross-section of the portion randomly sampled from the central portion in the widthwise direction of each of the stretched films were subjected to TEM observation with the transmission electron microscope JEM-1230 manufactured by JEOL Ltd. (acceleration voltage: 100 kV, direct magnification: 20000). As the observation samples, 100-nm-thick slices cut out with a freezing ultramicrotome were used.

By using each of the obtained photographs, at each of arbitrary two positions separated from each other by 5 µm or more, the number N of the domains present within the range of 5 µm in the thickness direction of the film was measured, and the domain spacing was determined on the basis of the following formula:

$$\text{Domain spacing}=5/N(\mu m)$$

With reference to FIG. 1, the derivation of the average domain spacing is described as follows. For example, at the position A in FIG. 1, there are 13 domains Ds, and hence the domain spacing is approximately 0.38 µm. For one sheet of TEM photograph, the domain spacings were measured at two positions; five sheets of TEM photographs were used and the domain spacings at 10 positions in total were measured, and the average value of these domain spacings was taken as the "average domain spacing."

(8) Tensile Strength and Tensile Elongation Rate of Stretched Film

The tensile strength and the tensile elongation rate of each of the stretched films were measured according to JIS K7127, in an environment of a temperature of 20° C. and a humidity of 65%. For each of the samples, the size was 10 mm×150 mm, the initial distance between the chucks was 100 mm, and the tensile speed was 500 mm/min.

(9) Flex Resistance of Stretched Film

By using the Gelbo tester manufactured by Rigaku Kogyo Co., Ltd., for each of the stretched films before and after the heat treatment, the flex resistance was evaluated on the basis of the number of pinholes occurring after repeated bending. As the sample, the stretched film cut out to a size of 300 mm in MD×200 mm in TD from the central portion in the widthwise direction of each of the films was used; the sample was held in a cylindrical shape of 3.5 inches (89 mm) in diameter; the initial holding distance in the lengthwise direction of the cylinder was set at 7 inches (178 mm) and the holding distance at the time of maximum bending was set at 1 inch (25.4 mm); the sample in a cylindrical form was bended 100 times and 500 times in an environment of 20° C. and 65% RH; subsequently, the numbers of pinholes after the 100-times and 500-times bending were counted (as the average value of three runs for each of the 100-times and 500-times bending). The heat treatment of each of the films was performed as follows: each of the films was heated in a state of being fixed to a metal frame for 5 minutes in a hot air dryer regulated at 250° C., and then allowed to stand to cool.

The flex resistance was evaluated according to the following standards. Practically, the evaluation result is preferably "average" or higher.

Excellent: The number of pinholes after 100-times bending and the number of pinholes after 500-times pinholes are both less than 1.

Good: The number of pinholes after 100-times bending is less than 1, and the number of pinholes after 500-times bending is 1 or more and less than 2.

Average: The number of pinholes after 100-times bending is less than 1, and the number of pinholes after 500-times bending is 2 or more and less than 5.

Poor: The number of pinholes after 100-times bending is 1 or more, or the number of pinholes after 500-times is 5 or more or the film is broken.

2. Materials

<Material Monomers>
(1) Linear Aliphatic Diamine
1,9-Nonanediamine (hereinafter, abbreviated as "NMDA" in some cases)
(2) Branched Aliphatic Diamine
2-Methyl-1,8-octanediamine (hereinafter, abbreviated as "MODA" in some cases)
(3) Dicarboxylic Acid
Terephthalic acid (hereinafter, abbreviated as "TPA" in some cases)
(4) Terminal Blocking Agent
Benzoic acid (hereinafter, abbreviated as "BA" in some cases)
<Catalyst>
Phosphorous acid (hereinafter, abbreviated as "PA" in some cases)
<Heat Stabilizer>
Sumilizer GA-80: Thermal decomposition temperature: 392° C., manufactured by Sumitomo Chemical Co., Ltd.
[Semi-Aromatic Polyamides (A)]
(1) Semi-Aromatic Polyamide A1

In a reactor, 1343 g of NMDA, 237 g of MODA, 1627 g of TPA (average particle size: 80 μm) (NMDA:MODA:TPA=85:15:99, molar ratio), 48.2 g of BA (4.0 mol % in relation to the total number of moles of the dicarboxylic acid component and the diamine component), 3.2 g of PA (0.1% by mass in relation to the total amount of the dicarboxylic acid component and the diamine component), and 1100 g of water were placed, and the air in the reactor was replaced with nitrogen. Then, the reaction mixture was stirred at 80° C. for 0.5 hour at 28 rotations per minute, and then increased in temperature to 230° C. Subsequently, the reaction mixture was heated at 230° C. for 3 hours. Then, the reaction mixture was cooled and the reaction product was taken out. The reaction product was pulverized, and heated at 220° C. for 5 hours in a dryer in a flow of nitrogen to undergo solid phase polymerization to yield a polymer.

Successively, 100 parts by mass of the resulting polymer and 0.4 part by mass of Sumilizer GA-80 were dry blended, and melt kneaded with a twin screw extruder having a screw diameter of 26 mm. The cylinder temperature of the twin screw extruder was 310° C. Subsequently, the kneaded mixture was extruded in a strand shape, cooled and cut to produce a pellet shaped "semi-aromatic polyamide A1."

(2) and (3) Semi-Aromatic Polyamides A2 and A3

In each of the semi-aromatic polyamides A2 and A3, the composition and the mixing amounts of the material monomers were altered as compared with the semi-aromatic polyamide A1, as shown in Table 1. Otherwise by performing the same operations as in the case of the semi-aromatic polyamide A1, the "semi-aromatic polyamide A2" and the "semi-aromatic polyamide A3" were produced.

Table 1 shows the copolymerization ratios and the property values of the semi-aromatic polyamides A1 to A3.

TABLE 1

| | | | Semi-aromatic polyamides | | |
|---|---|---|---|---|---|
| | | | A1 | A2 | A3 |
| Copolymerization ratio between components (molar ratio) | Diamine components | NMDA | 85 | 80 | 85 |
| | | MODA | 15 | 20 | 15 |
| | Dicarboxylic acid component | TPA | 99 | 99 | 99 |
| Terminal blocking agent (mol %) | | BA | 4 | 4 | 5.5 |
| Property values | Limiting viscosity | dL/g | 1.20 | 1.18 | 0.95 |
| | Melting point | ° C. | 306 | 304 | 304 |
| | Glass transition temperature | ° C. | 125 | 125 | 125 |

[Thermoplastic Elastomer (B)]

(1) Tafmer MH7020: Maleic anhydride-modified polyolefin, melt viscosity: 1.5 g/10 min, Tg: −65° C., manufactured by Mitsui Chemicals, Inc.

(2) Tafmer MA8510: Maleic anhydride-modified polyolefin, melt viscosity: 5.0 g/10 min, Tg: −55° C., manufactured by Mitsui Chemicals, Inc.

(3) Tuftec M1913: Maleic anhydride-modified polystyrene-hydrogenated polybutadiene copolymer, melt viscosity: 5 g/10 min, Tg: −20° C. and 105° C., manufactured by Asahi Kasei Corp.

(4) Tafmer A1050S: Acid-unmodified polyolefin, melt viscosity: 2.2 g/10 min, Tg: −65° C., manufactured by Mitsui Chemicals, Inc.

[Thermoplastic Elastomer-Containing Masterbatches]

(1) Thermoplastic Elastomer-Containing Masterbatch M1

A mixture was prepared by dry blending 75% by mass of the semi-aromatic polyamide A1, 25% by mass of Tafmer MH7020, which is a thermoplastic elastomer, and further 0.4 part by mass of Sumilizer GA-80, which is a heat stabilizer, in relation to 100 parts by mass of the total amount of the semi-aromatic polyamide and the thermoplastic elastomer. The resulting mixture was placed in a twin screw extruder having a screw diameter of 26 mm, with the cylinder temperature set at 310° C. by heating, melt kneaded and extruded in a strand shape. Subsequently, the extruded product was cooled and cut to produce the pellet-shaped thermoplastic elastomer-containing masterbatch M1.

(2) Thermoplastic Elastomer-Containing Masterbatches M2 to M6

In each of the thermoplastic elastomer-containing masterbatches M2 to M6, the types and the mixing ratio of the semi-aromatic polyamide and the thermoplastic elastomer were altered as compared with the thermoplastic elastomer-containing masterbatch M1, as shown in Table 2. Otherwise by performing the same operations as in the case of the production of the thermoplastic elastomer-containing masterbatch M1, the thermoplastic elastomer-containing masterbatches M2 to M6 were produced.

Table 2 shows the mixing ratios of the materials in the thermoplastic elastomer-containing masterbatches M1 to M6.

TABLE 2

|  |  |  | Thermoplastic elastomer-containing masterbatches | | | | | |
|---|---|---|---|---|---|---|---|---|
|  |  |  | M1 | M2 | M3 | M4 | M5 | M6 |
| Resin composition (mass ratio) | Semi-aromatic polyamides | A1 | 75 | — | — | — | — | — |
|  |  | A2 | — | 75 | 75 | 75 | 85 | — |
|  |  | A3 | — | — | — | — | — | 75 |
|  | Thermo-plastic elastomers | Olefin-based, with functional groups — Tafmer MH7020 | 25 | 25 | — | — | — | 25 |
|  |  | Olefin-based, with functional groups — Tafmer MA8510 | — | — | 25 | — | — | — |
|  |  | Styrene-based, with functional groups — Tuftec M1943 | — | — | — | 25 | — | — |
|  |  | Olefin-based, without functional groups — Tafmer A1050S | — | — | — | — | 15 | — |
|  | Heat stabilizer | Sumilizer GA-80 | 0.4 | 0.4 | 0.4 | 0.4 | 0.4 | 0.4 |

<Unstretched Film>
(1) Unstretched Film N1

In a single screw extruder having a screw diameter of 50 mm, with the cylinder temperature set at 320° C. by heating, 84 parts by mass of the semi-aromatic polyamide A1 and 16 parts by mass of the thermoplastic elastomer-containing masterbatch M1 were placed and melted to yield a molten polymer. The molten polymer was filtered by using a metal fiber sintered filter (NF-13, absolute filtration diameter: 60 μm, manufactured by Nippon Seisen Co., Ltd.).

Then, the molten polymer was extruded from a T-die set at 320° C. in a film shape to prepare a film-shaped melt. The melt was cooled by bringing the melt, by the electrostatic casting method, into close contact with a cooling roll set at 50° C., and thus a substantially non-oriented unstretched film (average thickness: 230 μm) was obtained.

Table 3 shows the mixing proportions of the semi-aromatic polyamide and the thermoplastic elastomer-containing masterbatch used for the unstretched film N1, and the resin composition of the unstretched film N1.

TABLE 3

|  |  |  |  |  | Unstretched films | | | | | | | | | | |
|---|---|---|---|---|---|---|---|---|---|---|---|---|---|---|---|
|  |  |  |  |  | N1 | N2 | N3 | N4 | N5 | N6 | N7 | N8 | N9 | N10 | N11 |
| Production conditions | Mixing proportions | Semi-aromatic polyamides | Type | | A1 | A2 | A2 | A2 | A2 | A2 | A2 | A2 | A2 | A2 | A3 |
|  |  |  | (parts by mass) | | 84 | 96 | 92 | 80 | 80 | 80 | 67 | 68 | 60 | 40 | 80 |
|  |  | Thermoplastic elastomer-containing masterbatches | Type | | M1 | M2 | M2 | M2 | M3 | M4 | M5 | M2 | M2 | M2 | M6 |
|  |  |  | (parts by mass) | | 16 | 4 | 8 | 20 | 20 | 20 | 33 | 32 | 40 | 60 | 20 |
| Unstretched films | Resin composition (parts by mass) | Semi-aromatic polyamides | A1 | | 96 | — | — | — | — | — | — | — | — | — | — |
|  |  |  | A2 | | — | 99 | 98 | 95 | 95 | 95 | 95 | 92 | 90 | 85 | — |
|  |  |  | A3 | | — | — | — | — | — | — | — | — | — | — | 95 |
|  |  | Thermoplastic elastomers | Olefin-based, with functional groups | Tafmer MH7020 | 4 | 1 | 2 | 5 | — | — | — | 8 | 10 | 15 | 5 |
|  |  |  | Olefin-based, with functional groups | Tafmer MA8510 | — | — | — | — | 5 | — | — | — | — | — | — |
|  |  |  | Styrene-based, with functional groups | Tuftec M1943 | — | — | — | — | — | 5 | — | — | — | — | — |
|  |  |  | Olefin-based, without functional groups | Tafmer A1050S | — | — | — | — | — | — | 5 | — | — | — | — |
|  |  | Heat stabilizer |  | Sumilizer GA-80 | 0.4 | 0.4 | 0.4 | 0.4 | 0.4 | 0.4 | 0.4 | 0.4 | 0.4 | 0.4 | 0.4 |

(2) Unstretched Films N2 to N11

In each of the unstretched films N2 to N11, the types and the mixing proportions of the semi-aromatic polyamide and the thermoplastic elastomer-containing masterbatch were altered as compared with the unstretched film N1, as shown in Table 3. Otherwise by performing the same operations as in the case of the production of the unstretched film N1, the unstretched films N2 to N11 were produced. For the unstretched film N4, by regulating the speed of the cooling roll, a film having an average thickness of 110 μm and a film having an average thickness of 180 μm were also obtained concurrently. For each of the unstretched films N3 and N6, by regulating the speed of the cooling roll, a film having an average thickness of 110 μm was also obtained concurrently.

Example 1

While the edges of the unstretched film N1 were being gripped with clips, the unstretched film N1 was biaxially stretched with a flat simultaneous biaxial stretching machine. The stretching conditions were such that the temperature of the preheating section was 125° C., the temperature of the stretching section was 130° C., the stretching strain rate in MD was 2400%/min, the stretching strain rate in TD was 2760%/min, the stretching magnification factor in MD was 3.0 and the stretching magnification factor in TD 3.3. After stretching, continuously in the same tenter of the biaxial stretching machine, heat setting was performed at 270° C., a 5% relaxation treatment was performed in the widthwise direction of the film, and thus a biaxially stretched film having an average thickness of 25 μm was obtained.

Examples 2 to 12 and Comparative Examples 1 to 3

In each of Examples 2 to 12 and Comparative Examples 1 to 3, the stretching magnification factor, the stretching temperature and the magnification factor for relaxation were altered, as compared with Example 1, as shown in Table 4. Otherwise in the same manner as in Example 1, the semi-aromatic polyamide films were produced.

Example 13

The unstretched film N1 was biaxially stretched with a flat successive stretching machine. First, the unstretched film was heated to 125° C. by roll heating or infrared ray heating, and stretched in the longitudinal direction with a stretching strain rate of 4000%/min and a magnification factor of 2.5 to yield a longitudinally stretched film. Successively and continuously, while the widthwise edges of the film were being gripped with the clips of the transverse stretching machine, the film was transversely stretched. In the transverse stretching, the temperature of the preheating section was 130° C., the temperature of the stretching section was 145° C., the stretching strain rate was 2000%/min and the stretching magnification factor in TD was 3.0. In the same tenter of the transverse stretching machine, heat setting was performed at 270° C., a 5% relaxation treatment was performed in the widthwise direction of the film, and thus a biaxially stretched film having an average thickness of 25 μm was obtained.

Table 4 shows, for each of Examples 1 to 13 and Comparative Examples 1 to 3, the used unstretched film, the stretching conditions, and the evaluation results of the stretched film.

TABLE 4

| | | | Examples | | | | | | | | |
|---|---|---|---|---|---|---|---|---|---|---|---|
| | | | 1 | 2 | 3 | 4 | 5 | 6 | 7 | 8 | 9 |
| Unstretched films | Type | | N1 | N4 | N4 | N4 | N6 | N6 | N3 | N3 | N5 |
| | Average thickness | μm | 230 | 110 | 180 | 230 | 110 | 230 | 110 | 230 | 230 |
| Stretching conditions | Stretching method | | Simultaneous | Simultaneous | Simultaneous | Simultaneous | Simultaneous | Simultaneous | Simultaneous | Simultaneous | Simultaneous |
| | Sketching magnification factors (MD × TD) | | 3 × 3.3 | 2 × 2 | 2.5 × 2.8 | 3 × 3.3 | 2 × 2 | 3 × 3.3 | 2 × 2 | 3 × 3.3 | 3 × 3.3 |
| | Stretching temperature(s) | ° C. | 130 | 125 | 130 | 130 | 125 | 130 | 125 | 130 | 130 |
| | Heat setting temperature | ° C. | 270 | 270 | 270 | 270 | 270 | 270 | 270 | 270 | 270 |
| | TD relaxation rate | % | 5 | 2 | 3 | 5 | 2 | 5 | 2 | 5 | 5 |
| | Stretchability | | Good | Good | Good | Good | Good | Good | Good | Good | Good |
| Stretched film | Average thickness | μm | 25 | 27 | 27 | 25 | 27 | 25 | 27 | 25 | 25 |
| | Thickness unevenness | | Excellent | Average | Good | Excellent | Average | Good | Average | Excellent | Excellent |
| | Dispersion state of domains | Average minor axis | μm | 0.05 | 0.10 | 0.07 | 0.05 | 0.15 | 0.08 | 0.10 | 0.05 | 0.12 |
| | | Average anisotropy index (MD/TD) | | 41/36 | 19/16 | 29/25 | 40/36 | 16/13 | 38/33 | 20/17 | 38/35 | 33/30 |
| | | Average domain spacing | μm | 0.5 | 0.7 | 0.5 | 0.3 | 0.9 | 0.4 | 1.3 | 0.7 | 0.6 |
| | Tensile strength | MD/TD MPa | 150/175 | 130/130 | 130/160 | 150/170 | 130/120 | 140/160 | 150/160 | 175/190 | 150/170 |
| | Tensile elongation rate | MD/TD % | 85/65 | 70/55 | 70/50 | 85/60 | 70/50 | 75/55 | 75/60 | 90/65 | 80/60 |

TABLE 4-continued

|  |  |  |  |  |  |  |  |  |  |
|---|---|---|---|---|---|---|---|---|---|
| Flex resistance | Before heat treatment | Excellent | Good | Excellent | Excellent | Good | Excellent | Average | Good | Excellent |
|  | After heat treatment | Excellent | Good | Good | Excellent | Average | Good | Average | Average | Good |

|  |  |  | Examples | | | | Comparative Examples | | |
|---|---|---|---|---|---|---|---|---|---|
|  |  |  | 10 | 11 | 12 | 13 | 1 | 2 | 3 |
| Unstretched films | Type | | N8 | N9 | N11 | N4 | N2 | N7 | N10 |
|  | Average thickness | μm | 230 | 230 | 230 | 180 | 230 | 230 | 230 |
| Stretching conditions | Stretching method | | Simul-taneous | Simul-taneous | Simul-taneous | Successive | Simul-taneous | Simul-taneous | Simul-taneous |
|  | Sketching magnification factors (MD × TD) | | 3 × 3.3 | 3 × 3.3 | 3 × 3.3 | 2.5 × 3.0 | 3 × 3.3 | 3 × 3.3 | 3 × 3.3 |
|  | Stretching temperature(s) | °C. | 130 | 130 | 130 | 125/145 | 130 | 130 | 130 |
|  | Heat setting temperature | °C. | 270 | 270 | 270 | 270 | 270 | 270 | 270 |
|  | TD relaxation rate | % | 5 | 5 | 5 | 5 | 5 | 5 | 5 |
|  | Stretchability | | Good | Good | Good | Good | Good | Good | Poor |
| Stretched film | Average thickness | μm | 25 | 25 | 25 | 26 | 25 | 25 | — |
|  | Thickness unevenness | | Good | Average | Average | Excellent | Excellent | Poor | Poor |
|  | Dispersion state of domains | Average minor axis μm | 0.05 | 0.06 | 0.07 | 0.06 | 0.05 | 0.65 | — |
|  |  | Average anisotropy index (MD/TD) | 40/37 | 41/37 | 37/33 | 35/40 | 42/38 | 25/20 | — |
|  |  | Average domain spacing μm | 0.2 | 0.2 | 0.4 | 0.3 | 1.5 | 1.8 | — |
|  | Tensile strength | MD/TD MPa | 140/160 | 135/160 | 140/160 | 145/180 | 180/200 | 120/540 | — |
|  | Tensile elongation rate | MD/TD % | 75/55 | 65/55 | 70/60 | 80/65 | 95/70 | 50/40 | — |
|  | Flex resistance | Before heat treatment | Excellent | Excellent | Excellent | Excellent | Average | Average | — |
|  |  | After heat treatment | Excellent | Excellent | Good | Excellent | Poor | Poor | — |

The semi-aromatic polyamide films of Examples 1 to 13 were high in heat resistance, excellent in the deformation resistances such as flex resistance, excellent in stretchability, and small in thickness unevenness.

With respect to the semi-aromatic polyamide film, Examples 2, 5, and 7 were lower than Examples 3 and 4, 6, and 8, respectively, in the stretching magnification factors, wherein Examples 2, 5, and 7 were the same as Examples 3 and 4, 6, and 8, respectively, in the resin composition. Accordingly, with respect to the domains of the thermoplastic elastomer, Examples 2, 5, and 7 were smaller than Examples 3 and 4, 6, and 8, respectively, in the average anisotropy indexes; and Examples 2, 5, and 7 were slightly larger than Examples 3 and 4, 6, and 8, respectively, in the average domain spacing; and Examples 2, 5, and 7 were slightly lower than Examples 3 and 4, 6, and 8, respectively, in the flex resistance.

In each of the semi-aromatic polyamide films of Examples 7 and 8, the content of the thermoplastic elastomer was the minimum limit value of the range specified in the present invention. Accordingly, as compared with Examples 2 and 4, Examples 7 and 8 were slightly larger in average domain spacing, and slightly smaller in the improvement effect of the flex resistance, in particular the flex resistance after the heat treatment, wherein Examples 2 and 4 were different from Examples 7 and 8 only in the content of the thermoplastic elastomer used, and were larger in the content of the thermoplastic elastomer used than the minimum limit value of the range of the content of the thermoplastic elastomer, specified in the present invention.

In the semi-aromatic polyamide film of Example 11, the content of the thermoplastic elastomer was the maximum limit value of the range of the content of the thermoplastic elastomer, specified in the present invention. Accordingly, the semi-aromatic polyamide film of Example 11 were lower in the stretchability, slightly larger in the film thickness unevenness, and slightly lower in tensile strength and tensile elongation rate than the semi-aromatic polyamide films of Examples 4 and 10, wherein Examples 4 and 10 were different from Example 11 only in the content of the thermoplastic elastomer used, and the content of the thermoplastic elastomer in each of Examples 4 and 10 was smaller than the maximum limit value of the range of the content of the thermoplastic elastomer, specified in the present invention.

The semi-aromatic polyamide film of Example 12 was small in the limiting viscosity of the semi-aromatic polyamide used. Accordingly, the semi-aromatic polyamide film of Example 12 was lower in stretchability, slightly larger in the thickness unevenness of the film, and slightly smaller in the improvement effect of the flex resistance after the heat treatment than the semi-aromatic polyamide film of Example 4, which was different only in the limiting viscosity of the semi-aromatic polyamide used.

In the semi-aromatic polyamide film of Comparative Example 1, the content of the thermoplastic elastomer used was lower than the range of the content of the thermoplastic elastomer, specific in the present invention. Accordingly, the semi-aromatic polyamide film of Comparative Example 1 was poor in the flex resistance, in particular, in the flex resistance after the heat treatment.

In the semi-aromatic polyamide film of Comparative Example 2, the thermoplastic elastomer used did not have functional groups. Accordingly, the semi-aromatic polyamide film of Comparative Example 2 was low in stretchability, and remarkably large in the thickness unevenness of the film. The semi-aromatic polyamide film of Comparative Example 2 was also large both in the average minor axis of the domains and in the average domain spacing, and was poor in flex resistance.

In the semi-aromatic polyamide film of Comparative Example 3, the content of the thermoplastic elastomer used was larger than the range of the content of the thermoplastic elastomer, specified in the present invention. Accordingly, the semi-aromatic polyamide film of Comparative Example 3 was poor in stretchability, and hence, no stretched film having an area magnification factor of 10 was able to be obtained.

The invention claimed is:

1. A semi-aromatic polyamide film comprising:
   98 to 90% by mass of a semi-aromatic polyamide (A) including units of a dicarboxylic acid component that is 60 to 100 mol % of terephthalic acid and units of a diamine component that is 60 to 100 mol % of an aliphatic diamine having 9 carbon atoms;
   2 to 10% by mass of a thermoplastic elastomer (B) having functional groups, and
   the total amount of (A) and (B) is 100% by mass, wherein
   the thermoplastic elastomer (B) having functional groups is an ethylene-α-olefin copolymer based thermoplastic elastomer modified with a dicarboxylic acid and/or a derivative of the dicarboxylic acid,
   the thermoplastic elastomer (B) is distributed in the film in a state in which an average minor axis of domains of the thermoplastic elastomer B is 0.01 to 1.0 μm and an average domain spacing of the thermoplastic elastomer (B) in a cross section in a lengthwise direction of the film is 0.1 to 1.5 μm, and
   the semi-aromatic polyamide film is stretched.

* * * * *